(12) United States Patent
Beser

(10) Patent No.: US 7,443,873 B1
(45) Date of Patent: Oct. 28, 2008

(54) VIRTUAL UPSTREAM CHANNEL PROVISIONING AND UTILIZATION IN BROADBAND COMMUNICATION SYSTEMS

(75) Inventor: Nurettin Burcak Beser, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1058 days.

(21) Appl. No.: 09/999,790

(22) Filed: Oct. 25, 2001

Related U.S. Application Data

(60) Provisional application No. 60/314,233, filed on Aug. 21, 2001.

(51) Int. Cl.
*H04J 3/26* (2006.01)
(52) U.S. Cl. ........................ 370/432; 370/437
(58) Field of Classification Search ........................ None
See application file for complete search history.

(56) References Cited

U.S. PATENT DOCUMENTS

| 5,648,958 | A  | * | 7/1997  | Counterman     | 370/458 |
|-----------|----|---|---------|----------------|---------|
| 6,223,222 | B1 | * | 4/2001  | Fijolek et al. | 709/227 |
| 6,331,987 | B1 | * | 12/2001 | Beser          | 370/486 |
| 6,751,230 | B1 | * | 6/2004  | Vogel et al.   | 370/432 |
| 6,917,614 | B1 | * | 7/2005  | Laubach et al. | 370/392 |
| 2002/0118643 | A1 | * | 8/2002 | Shalvi et al. | 370/230 |
| 2003/0021229 | A1 | * | 1/2003 | Kadambi et al. | 370/229 |

* cited by examiner

*Primary Examiner*—Wing F. Chan
*Assistant Examiner*—Anthony Sol
(74) *Attorney, Agent, or Firm*—Harrity & Harrity, LLP

(57) ABSTRACT

A method and apparatus for provisioning virtual upstream channels within one physical upstream channel. Each virtual upstream channel is assigned to a group of cable modems that share certain operational parameters. New virtual upstream channels can be provisioned as needed and existing virtual upstream channels can be deleted, as needed.

21 Claims, 14 Drawing Sheets

VIRTUAL UPSTREAM CHANNEL PROVISIONING AND UTILIZATION IN BROADBAND COMMUNICATION SYSTEMS

RELATED APPLICATIONS

This application claims priority from 60/314,233 an earlier-filed provisional patent application entitled "Virtual Upstream Channels" filed on Aug. 21, 2001.

FIELD OF THE INVENTION

The present invention relates to broadband communications systems. More particularly, the present invention is directed to a upstream channel provisioning in broadband systems such as cable modem systems.

BACKGROUND

Recently, there has been an explosive demand for services, such as data, voice, and video, to be delivered over broadband communications systems. So-called cable modem technology is one of the most popular methods of providing such broadband services to subscribers. Cable modem technology competes with technologies such as Asymmetric Digital Subscriber Lines (ADSL) and ISDN (Integrated Services Digital Network). Many in the industry forecast that cable modem systems will be the prevailing technology for providing broadband services since cable television is already widely in use.

FIG. 1 illustrates a simplified diagram of a conventional cable modem system. The DOCSIS (Data Over Cable Service Interface Specifications) Radio Frequency Interface Specification specifies the transfer of IP traffic, between the cable headend system and customer locations, over an all-coaxial or a hybrid-fiber/coax (HFC) cable network 52. The transmission path over the cable system is realized at the headend by a Cable Modem Termination System (CMTS) 50, and at each customer location by a Cable Modem (CM) 56. The DOCSIS standard defines a single transmitter for each downstream channel—the CMTS 50. All CMs 56 listen to all frames transmitted on the downstream channel upon which they are registered and accept those where the destinations match the CM 56 itself or CPEs (Customer Premises Equipment) 58 connected. CMs 56 can communicate with other CMs 56 only through the CMTS 50.

The upstream channel is characterized by many transmitters (i.e. CMs 56) and one receiver (i.e. the CMTS 50). Time in the upstream channel is slotted, providing for TDMA at regulated time ticks. The CMTS 50 provides the time reference and controls the allowed usage for each interval. Intervals may be granted for transmissions by particular CMs 56, or for contention by all CMs 56. CMs 56 may contend to request transmission time. To a limited extent, CMs 56 may also contend to transmit actual data. In both cases, collisions can occur and retries are used.

The upstream Physical Media Dependent (PMD) sublayer uses a Frequency Division Multiple Access (FDMA)/TDMA burst modulation format, which provides five symbol rates and two modulation formats (Quadrature Phase Shift Keying (QPSK) and 16-QAM (Quadrature Amplitude Modulation)). The modulation format includes pulse shaping for spectral efficiency, is carrier-frequency agile, and has selectable output power level. The PMD sublayer format includes a variable-length modulated burst with precise timing beginning at boundaries spaced at integer multiples of 6.25 sec apart (which is 16 symbols at the highest data rate). Each burst supports a flexible modulation, symbol rate, preamble, randomization of the payload, and programmable FEC (Forward Error Correction) encoding. All of the upstream transmission parameters associated with burst transmission outputs from the CM 56 are configurable by the CMTS 50 via MAC (Media Access Controller) messaging.

The upstream modulator is part of the CM 56 which interfaces with the cable network. The modulator contains the actual electrical-level modulation function and the digital signal-processing function; the latter provides the FEC, preamble prepend, symbol mapping, and other processing steps. The DOCSIS standard was developed with the idea of buffering the bursts in the signal processing portion, and with the signal processing portion (1) accepting the information stream a burst at a time, (2) processing this stream into a complete burst of symbols for the modulator, and (3) feeding the properly-timed bursted symbol stream to a memoryless modulator at the exact burst transmit time. The memoryless portion of the modulator only performs pulse shaping and quadrature upconversion.

At the Demodulator, similar to the Modulator, there are two basic functional components: the demodulation function and the signal processing function. Unlike the Modulator, the Demodulator resides in the CMTS 50 and the DOCSIS standard envision that there will be one demodulation function (not necessarily an actual physical demodulator) for each carrier frequency in use. The demodulation function would receive all bursts on a given frequency.

The demodulation function of the Demodulator accepts a varying-level signal centered around a commanded power level and performs symbol timing and carrier recovery and tracking, burst acquisition, and demodulation. Additionally, the demodulation function provides an estimate of burst timing relative to a reference edge, an estimate of received signal power, an estimate of signal-to-noise ratio, and may engage adaptive equalization to mitigate the effects of a) echoes in the cable plant, b) narrowband ingress and c) group delay. The signal-processing function of the Demodulator performs the inverse processing of the signal-processing function of the Modulator. This includes accepting the demodulated burst data stream and decoding, etc., and possibly multiplexing the data from multiple channels into a single output stream. The signal-processing function also provides the edge-timing reference and gating-enable signal to the demodulators to activate the burst acquisition for each assigned burst slot. The signal-processing function may also provide an indication of successful decoding, decoding error, or fail-to-decode for each codeword and the number of corrected Reed-Solomon symbols in each codeword. For every upstream burst, the CMTS 50 has a prior knowledge of the exact symbol rate, preamble, and burst length.

Consider the case of two cable modems (CMs) that belong to different cable segments communicating with a single Cable Modem Termination System (CMTS) illustrated in FIG. 2. In the conventional cable modem system operation, each cable modem CM 630 and CM 620 would share a single downstream path to obtain data/signals from the CMTS 610. Also, each cable modem CM 630 and CM 620 has its own upstream path to send data/signals to the CMTS 610. Thus, two upstream frequencies and one downstream frequency is used by the system of FIG. 2. The CMTS would have a port for each CM 630 and CM 620 for the upstream traffic thereto, while having only one port for downstream traffic to both CM 630 and CM 620. Since the port to which the CMs 630 and 620 are connected is known, the CMTS knows UCID (Upstream Channel Identifier, discussed below) to assign to each cable modem. Consequently, each UCID is associated with its own upstream frequency unique to the UCID in current DOCSIS implementations. Using the UCID it is possible for CMTS 610 to schedule the CMs 620 and 630 on different upstream frequencies and then send these scheduling information on the bandwidth allocation MAP messages. The bandwidth allocation MAP messages are first parsed for the UCID by the CM such that the CM would only listen to its own MAP messages that contain the scheduling information regarding the upstream channel that it will be transmitting. If a DOCSIS downstream is associated with for example, four upstreams, than the CMTS would send 4 bandwidth allocation MAP messages that each one specifies the bandwidth allocation to each frequency that it is associated.

The UCID is also associated with an Upstream Channel Descriptor (UCD). The Upstream Channel Descriptor defines multiple DOCSIS properties, such as mini-slot size, symbol rate, frequency, and preamble pattern and burst descriptor. In sum it can be said that, the UCD defines how the CM communicates to CMTS on the Physical Media Dependent (PMD) sublayer of DOCSIS specification.

FIG. 3 describes DOCSIS bandwidth allocation and where transmit opportunities occur. The CMTS controls assignments on the upstream channel through the bandwidth allocation MAP and determines which mini-slots are subject to collisions. The CMTS allows collisions on either Requests or Data PDUs (Protocol Data Units). A "transmit opportunity" ("tx opportunity") is defined as any mini-slot in which one or more CMs may be allowed to start a transmission. The CMTS generates the time reference for identifying these slots.

For example, it may grant some number of contiguous slots to a CM for it to transmit a data PDU. The CM times its transmission so that the CMTS receives it in the time reference specified. This section describes the elements of protocol used in requesting, granting, and using upstream bandwidth. The basic mechanism for assigning bandwidth management is the bandwidth allocation MAP.

Upstream bandwidth allocation is characterized as follows. The bandwidth allocation MAP is a MAC Management message transmitted by the CMTS on the downstream channel which describes, for some interval of time, the uses to which the upstream frequency will be used by a given CM. A given MAP may describe some time slots as grants for particular stations to transmit data in, other time slots as available for contention transmission, and other slots as an opportunity for new stations to join the link.

Many different scheduling algorithms may be implemented in the CMTS by different vendors as DOCSIS does not mandate a particular algorithm. Instead, it describes the protocol elements by which bandwidth is requested and granted. Each upstream channel is characterized by an Upstream Channel Descriptor (UCD). FIG. 4 illustrates basic structure of a UCD message. A UCD is transmitted by the CMTS at periodic intervals to define the characteristics of an upstream channel. A separate message is transmitted for each upstream that contains the following information:

Configuration Change Count: Incremented by one (modulo the field size) by the CMTS whenever any of the values of this channel descriptor change. If the value of this count in a subsequent UCD remains the same, the CM can quickly decide that the remaining fields have not changed, and may be able to disregard the remainder of the message. This value is also referenced from the MAP.

Mini-slot Size: The size T of the Mini-Slot for this upstream channel in units of the Timebase Ticks of 6.25 s. Allowable values are $T=2^M$, $M=1, \ldots 7$. That is, $T=2, 4, 8, 16, 32, 64$ or $128$.

UCID: The identifier of the upstream channel to which this message refers. This identifier is arbitrarily chosen by the CMTS and is only unique within the MAC-Sublayer domain.

Downstream Channel ID: The identifier of the downstream channel on which this message has been transmitted. This identifier is arbitrarily chosen by the CMTS and is only unique within the MAC-Sublayer domain.

Burst Descriptors Burst Descriptors are composed of an upstream Interval Usage Code, followed by encoding that defines, for each type of upstream usage interval, the physical-layer characteristics that are to be used during that interval. A burst profile consists of a set of specific PHY (physical layer) parameters-modulation, preamble length, Reed-Solomon block size, Reed-Solomon error correction capability, scrambler seed, differential encoding on/off, shortened last codeword mode on/off, maximum burst size, and guard time size. Burst profiles are assigned on an upstream channel basis in a downstream MAC Management Message called the Upstream Channel Descriptor (UCD). The idea was that multiple burst profiles could be defined and that a cable modem (CM) would have these sets of parameters stored in the PHY transmitter, and the CM could make use of different burst profiles.

FIG. 5 illustrates The contents of overall channel information and burst descriptors which are Type Length Value (TLV) encoded. The first three TLVs that a UCD message contains symbol rate, frequency, and preamble superstring which applies to overall upstream channel. It also contains a plurality of burst descriptors which describes the characteristics of the upstream transmission depending on the Interval Usage Code (Table 1) of the transmission as scheduled by the CMTS with MAP messages.

FIG. 6 illustrates an upstream bandwidth allocation MAP message. The upstream bandwidth allocation MAP is a varying-length MAC Management message that is transmitted by the CMTS to define transmission opportunities on the upstream channel. It includes a fixed-length header followed by a variable number of information elements (IEs) message which contains the information regarding:

Upstream Channel ID: The identifier of the upstream channel to which this message refers.

UCD Count: Matches the value of the Configuration Change Count of the UCD which describes the burst parameters which apply to this map.

Number of Elements: Number of information elements in the map.

Alloc Start Time: Effective start time from CMTS initialization (in mini-slots) for assignments within this map.

Ack Time: Latest time, from CMTS initialization, (mini-slots) processed in upstream. This time is used by the CMs for collision detection purposes.

Ranging Backoff Start: Initial back-off window for initial ranging contention, expressed as a power of two. Values range 0-15 (the highest order bits must be unused and set to 0).

Ranging Backoff End: Final back-off window for initial ranging contention, expressed as a power of two. Values range 0-15 (the highest order bits must be unused and set to 0).

The allocation MAP is a varying-length MAC Management message that is transmitted by the CMTS to define transmission opportunities on the upstream channel. It includes a fixed-length header followed by a variable number of Information Elements (IEs) in the message being transmitted by the CMTS. The number of Transmit Opportunities associated with a particular Information Element (IE) in a MAP is dependent on the total size of the region as well as the allowable size of an individual transmission.

FIG. 7 illustrates the format of Information Elements. Each IE consists of a 14-bit Service ID, a 4-bit type code, and a 14-bit starting offset. Since all stations will scan all IEs, it is critical that IEs be short and relatively fixed format. IEs within the MAP are strictly ordered by starting offset. For most purposes, the duration described by the IE is inferred by the difference between the IEs starting offset and that of the following IE. For this reason, a Null IE terminates the list.

Table 1 below lists IEs and their corresponding Interval Usage Codes (IUCs).

TABLE 1

Information Elements and IUCs

| Interval Usage Code | Information Element Name |
|---|---|
| 1 | Request |
| 2 | REQ/Data |
| 3 | Initial Maintenance |
| 4 | Station Maintenance |
| 5 | Short Data Grant |
| 6 | Long Data Grant |
| 7 | Null IE |
| 8 | Data Acknowledge |
| 9-14 | Reserved |
| 15 | Expanded IUC |

Table 1: Information Elements and IUCs

As an example, assume a REQ (Request) IE defines a region of 12 mini-slots. If the UCD defines a REQ Burst Size that fits into a single mini-slot then there are 12 Transmit Opportunities associated with this REQ IE, i.e., one for each mini-slot. If the UCD defines a REQ that fits in two mini-slots, then there are six Transmit Opportunities and a REQ can start on every other mini-slot.

As another example, assume a REQ/Data IE that defines a 24 mini-slot region. If it is sent with an SID of 0×3FF4, then a CM can potentially start a transmit on every fourth mini-slot; so this IE contains a total of six Transmit Opportunities (TX OPs). Similarly, a SID of 0×3FF6 implies four TX OPs; 0×3FF8 implies three TX OPs; and 0×3FFC implies two TX OPs.

For an Initial Maintenance IE, a CM starts its transmission in the first mini-slot of the region; therefore it has a single Transmit Opportunity. The remainder of the region is used to compensate for the round trip delays since the CM has not yet been ranged. Station Maintenance IEs, Short/Long Data Grant IEs and unicast Request IEs are unicast and thus are not typically associated with contention Transmit Opportunities. They represent a single dedicated, or reservation based, Transmit Opportunity.

FIG. 8 illustrates the format of a DOCSIS MAC frame. A frame is a unit of data exchanged between two (or more) entities at the Data Link Layer. A MAC frame consists of a MAC Header and may incorporate a variable-length data PDU. The variable-length PDU includes a pair of 48-bit addresses, data, and a CRC (Cyclic Redundancy Check). In special cases, the MAC Header may encapsulate multiple MAC frames into a single MAC frame. A MAC frame is the basic unit of transfer between MAC sublayers at the CMTS and the cable modem. The same basic structure is used in both the upstream and downstream directions. MAC frames are variable in length. The term "frame" is used in this context to indicate a unit of information that is passed between MAC sublayer peers. Preceding the MAC frame is either PMD sublayer overhead (upstream) or an MPEG (Motion Picture Experts Group) transmission convergence header (downstream). The first part of the MAC frame is the MAC Header. The MAC Header uniquely identifies the contents of the MAC frame.

FIG. 9 illustrates the interchange between the CM and the CMTS when the CM has data to transmit Suppose a given CM has a data PDU available for transmission.

1. At time $t_1$, the CMTS transmits a MAP whose effective starting time is $t_3$. Within this MAP is a Request IE which will start at $t_5$. The difference between $t_1$ and $t_3$ is needed to allow for:

Downstream propagation delay (including FEC interleaving) to allow all CMs to receive the Map Processing time at the CM (allows the CMs to parse the Map and translate it into transmission opportunities)

Upstream propagation delay (to allow the CMs transmission of the first upstream data to begin in time to arrive at the CMTS at time $t_3$);

2. At $t_2$, the CM receives this MAP and scans it for request opportunities. In order to minimize request collisions, it calculates $t_6$ as a random offset based on the Data Backoff Start value in the most recent MAP;

3. At $t_4$, the CM transmits a request for as many mini-slots as needed to accommodate the PDU. Time $t_4$ is chosen based on the ranging offset so that the request will arrive at the CMTS at $t_6$.

4. At $t_6$, the CMTS receives the request and schedules it for service in the next MAP. (The choice of which requests to grant will vary with the class of service requested, any competing requests, and the algorithm used by the CMTS.)

5. At $t_7$, the CMTS transmits a MAP whose effective starting time is $t_9$. Within this MAP, a data grant for the CM will start at $t_{11}$.

6. At $t_8$, the CM receives the MAP and scans for its data grant.

7. At $t_{10}$, the CM transmits its data PDU so that it will arrive at the CMTS at $t_{11}$. Time $t_{10}$ is calculated from the ranging offset as in step 3.

Steps 1 and 2 need not contribute to access latency if CMs routinely maintain a list of request opportunities. At Step 3, the request may collide with requests from other CMs and be lost. The CMTS does not directly detect the collision. The CM determines that a collision (or other reception failure) occurred when the next MAP fails to include acknowledgment of the request. The CM will then perform a back-off algorithm and retry.

At Step 4, the CMTS scheduler fail to accommodate the request within the next MAP. If so, it will reply with a zero-length grant in that MAP or discard the request by giving no grant at all. It will continue to report this zero-length grant in all succeeding maps until the request can be granted or is discarded. This will signal to the CM that the request is still pending. So long as the CM is receiving a zero-length grant, it will not issue new requests for that service queue.

DOCSIS allows various combinations of upstream and downstream channels within one MAC service access point. The upstream bandwidth allocation protocol allows for multiple upstream channels to be managed via one or many downstream channels. If multiple upstream channels are associated with a single downstream channel, then the CMTS sends one bandwidth allocation MAP per upstream channel. The bandwidth allocation MAP's channel identifier, taken with the Upstream Channel Descriptor Message, specifies to which channel each bandwidth allocation MAP applies. There is no requirement that the maps be synchronized across channels.

When a DOCSIS certified CM reboots it first scans for a downstream channel (it first looks into the stored last operational parameters). A downstream channel is considered valid when:
- synchronization of the QAM symbol timing
- synchronization of the FEC framing
- synchronization of the MPEG packetization
- recognition of SYNC downstream MAC messages is achieved.

After synchronization, the CM will wait for an upstream channel descriptor message (UCD) from the CMTS in order to retrieve a set of transmission parameters for a possible upstream channel. These messages are transmitted periodically from the CMTS for all available upstream channels and are addressed to the MAC broadcast address. The CM will determine whether it can use the upstream channel from the channel description parameters.

The CM would then pick one of the upstream channel IDs in its table and wait for the initial ranging period for this upstream channel ID in the bandwidth allocation MAP signal, and try to range in the timeframe allocated. If initial ranging is not successful, then the next upstream channel ID is selected, and the procedure restarted from UCD extraction. When there are no more channel IDs to try, then the CM will continue scanning to find another downstream channel.

The ranging request message does not include an Upstream Channel ID since it is inherently assumed in DOCSIS that the frequency defines the Upstream Channel ID. Due to this reason the DOCSIS specification mandates that the CM have to use whatever Upstream Channel ID is returned by the CMTS in the Ranging Response message. In other words even though the CM may choose any Upstream Channel ID to transmit the initial ranging request the CMTS has the ultimate power to make the CM to use a certain Upstream Channel ID.

From this point on the CM is to use the given Upstream Channel ID, when it is parsing for the transmission opportunities the CM has to first find the one with matching Upstream Channel ID. And then parse the bandwidth allocation MAP to find the SIDs that it is using. After the registration it is possible that the CM would receive a Upstream Channel Change Request message stating that it has to switch to a different Upstream Channel ID. The CM in response will be sending two Upstream Channel Change Response messages in the same frequency one that states the reception of the Upstream Channel Change request. Afterwards the CM is to parse for Upstream Channel ID bandwidth allocation MAP message for transmission opportunities send to broadcast SIDs or SIDs that belong to the CM.

If multiple downstream channels are associated with a single upstream channel, the CMTS must ensure that the bandwidth allocation MAP reaches all CMs. That is, if some CMs are attached to a particular downstream channel, then the bandwidth allocation MAP will be transmitted on that channel. This may necessitate that multiple copies of the same bandwidth allocation MAP be transmitted. The Alloc Start Time in the bandwidth allocation MAP header will always relate to the SYNC reference on the downstream channel on which it is transmitted.

If multiple downstream channels are associated with multiple upstream channels, the CMTS may need to transmit multiple copies of multiple maps to ensure both that all upstream channels are mapped and that all CMs have received their needed maps.

After synchronization, the CM will wait for an upstream channel descriptor message (UCD) from the CMTS in order to retrieve a set of transmission parameters for a possible upstream channel. The UCD messages are transmitted periodically from the CMTS for all available upstream channels and are addressed to the MAC broadcast address. The CM will determine whether it can use the upstream channel from the channel description parameters.

The CM will collect all UCDs, which are different in their upstream channel ID field to build a set of usable channel IDs. If no channel can be found after a suitable timeout period, then the CM will continue scanning to find another downstream channel. The CM determines whether it can use the upstream channel from the channel description parameters. If the channel is not suitable, then the CM will try the next upstream channel ID until it finds a usable channel. If the channel is suitable, the CM will extract the parameters for this upstream from the UCD. It then will wait for the next SYNC message and extract the upstream mini-slot timestamp from this message. The CM then will wait for a bandwidth allocation MAP for the selected channel. It may begin transmitting upstream in accordance with the MAC operation and the bandwidth allocation mechanism.

The CM will perform initial ranging at least once. If initial ranging is not successful, then the next upstream channel ID is selected, and the procedure restarted from UCD extraction. When there are no more channel IDs to try, then the CM will continue scanning to find another downstream channel. At any time after registration, the CMTS may direct the CM to change its upstream channel. This can be done for traffic balancing, noise avoidance, or any of a number of other reasons.

FIG. 10 illustrates an example of a single downstream channel and four upstream channels. In FIG. 10, the four upstream channels are on separate fibers serving four geographical communities of modems. The CMTS has access to the one downstream and all four upstreams, while each CM has access to the one downstream and only one upstream.

In this topology, the CMTS transmits Upstream Channel Descriptors (UCDs) and MAPs for each of the four upstream channels related to the shared downstream channel. Unfortunately, each CM cannot determine which fiber branch it is attached to because there is no way to convey the geographical information on the shared downstream channel. At initialization, the CM randomly picks a UCD and its corresponding MAP. The CM then chooses an Initial Maintenance opportunity on that channel and transmits a Ranging Request.

The CMTS will receive the Ranging Request and will redirect the CM to the appropriate upstream channel identifier by specifying the upstream channel ID in the Ranging Response. The CM will then use the upstream channel ID of the Ranging Response, not the channel ID on which the Ranging Request was initiated. This is necessary only on the first Ranging Response received by the CM. The CM will continue the ranging process normally and proceed to wait for station maintenance IEs. From then on, the CM will be using the bandwidth allocation MAP that is appropriate to the fiber branch to which it is connected. If the CM ever has to redo initial maintenance, it may start with its previous known UCD instead of choosing one at random.

Below are the MAC messages that contain Channel Ids:
Upstream Channel Descriptor
Bandwidth Allocation MAP
Ranging Response
Dynamic Channel Change request
With unsynchronized timestamps:
Since upstream synchronization relies on downstream timestamps, each upstream channel must be associated with the time stamp of one of the downstream channels.

The downstream channels should only transmit MAP messages and UCD messages that pertain to their associated upstream channels.

To highlight the key points of conventional architectures, current DOCSIS implementations use one frequency per DOCSIS Upstream Channel:

Only two upstream burst profiles are available for data that is granted;

There are rules defining which of the two burst profiles is used based solely upon MAC PDU length; and All CMs on the same upstream channel use the same minislot size, symbol rate, and burst profiles.

FIG. 11 illustrates a DOCSIS System with cable modems of different noise levels. For example, suppose on an upstream channel, some CMs can achieve adequate upstream Bit Error Rate (BER) performance using 16-QAM and a relatively low error-correcting Reed-Solomon code while others require QPSK and more Reed-Solomon error correction as depicted in FIG. 11. The modems depicted on the upper portion have better performance (such that a less robust more efficient burst profile can be used) on their portion of the cable segment such that they can sustain a 16-QAM modulation whereas the CMs on the lower portion has a worse performing cable segment (needs more robust hence less efficient burst profile) such that they can only sustain acceptable BER with QPSK modulation.

If these CMs are to run on the present DOCSIS systems, and it is desired to provide all CMs with adequate BER performance, the upstream channel descriptor parameters will have to accommodate the CMs experiencing the less robust transmission, in other words the DOCSIS upstream channel has to be used as if all the CMs are in the same noise/performance characteristics of the worst connection as shown in FIG. 12. In FIG. 12 all CMs are forced to QPSK modulation.

However, this is a sacrifice to the CMs, which can successfully use 16-QAM and less Reed-Solomon parity, and it is a sacrifice to the system as a whole because the capacity of the upstream channel could be much better utilized by some CMs as opposed to others.

Segregating modems into two distinct upstream frequencies has a number of objections. In some cases, from a node, there will only be one upstream frequency available, all the other frequencies will be used for other purposes such as Video on demand, non-DOCSIS voice transport. Also, the number of CMs in the high and low error rate categories may not correspond well with the available capacity of the different channels provided to them. For example it is possible that only a cope of modems are in the high noise region that requires QPSK modulation.

One solution is to segregate CMs experiencing higher error rates on particular frequencies that run at more robust transmission modes. Assume that as depicted in FIG. 13 there are two DOCSIS upstream frequencies (RF Frequency #1 and RF Frequency #2 with upstream channel descriptors set as such that the CMs with lower noise will run 16-QAM and higher will run in QPSK mode with proper settings. Another consideration is that high utilization on a particular channel associated with a particular level of BER performance may prevent another CM from being assigned to it, and thus, the CM is put on another channel where it really does not belong. It would be much more efficient from a system standpoint to have the ability to handle both on the same channel.

It would seem impairments impact all CMs on an upstream plant or upstream channel, and thus, allowing some CMs to use 16-QAM and less Reed-Solomon parity and others QPSK and that more Reed-Solomon parity is not necessary. For Additive White Gaussian Noise, impulse noise, or narrowband ingress, the noise "funneling" effect of the upstream HFC plant (by nature of the topology) results in impact on all users on that upstream channel. So, knowledge of the level of these impairments on an upstream channel helps to determine the baseline burst profile parameters to be set to make the upstream transmission robust. This can be done in an automated fashion by a CMTS with advanced channel monitoring capabilities.

However, there are other impairments that do not impact all CM signals received in the upstream, but may only impact a particular CM or CMs on a segment of the plant. For example, impairments and distortion can be due to a tap or amplifier that is malfunctioning or has degraded. Or for example, a particular CM may have a degraded component or suffer a non-fatal fault that impacts its transmission performance. In these cases, it would be possible for the CMTS, through its channel monitoring functions, to ascertain which CM or CMs are impacted, and it would be beneficial that these modems could be assigned upstream channels that could better overcome their localized impairments.

SUMMARY

A method and apparatus for provisioning virtual upstream channels within one physical upstream channel is disclosed. Each virtual upstream channel is assigned to a group of cable modems that share certain operational parameters. New virtual upstream channels can be provisioned as needed and existing virtual upstream channels can be deleted, as needed.

DETAILED DESCRIPTION OF THE INVENTION

In brief, the invention, in various embodiments, consists of utilizing one physical upstream channel, i.e. frequency, to provision more than one virtual upstream channel therein. In the following specification, the term 'virtual upstream channel' will be used when multiple upstream channel identifiers use the same frequency in the same cable segment. Cable modems are grouped according to their operational parameters and the cable modems in each group share a single virtual upstream channel. New virtual upstream channels may be added and existing virtual upstream channels deleted, as needed. The operational parameters include the modulation scheme used by the cable modems, as well as burst profiles, symbol rate and mini-slot size. Newly registering cable modems can be added to any of the groups, and thus, be assigned to any existing or even new virtual upstream channel. Perceived latency and quality-of-service are additional parameters that can be used in deciding what virtual upstream channels to provision or how to group cable modems into those virtual upstream channels.

Figure 1:
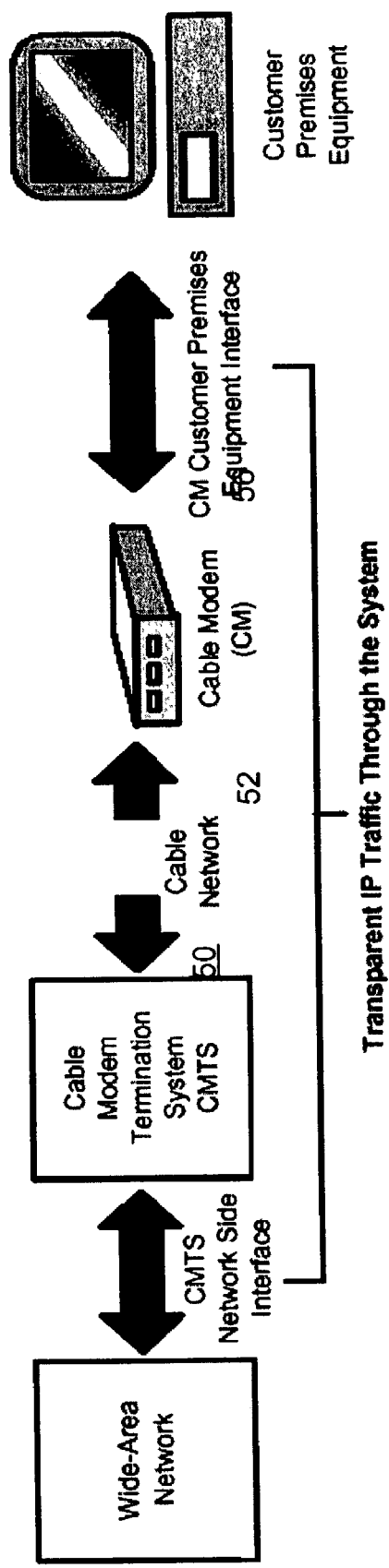
FIG. 1 illustrates a simplified diagram of a conventional cable modem system.
Figure 2:
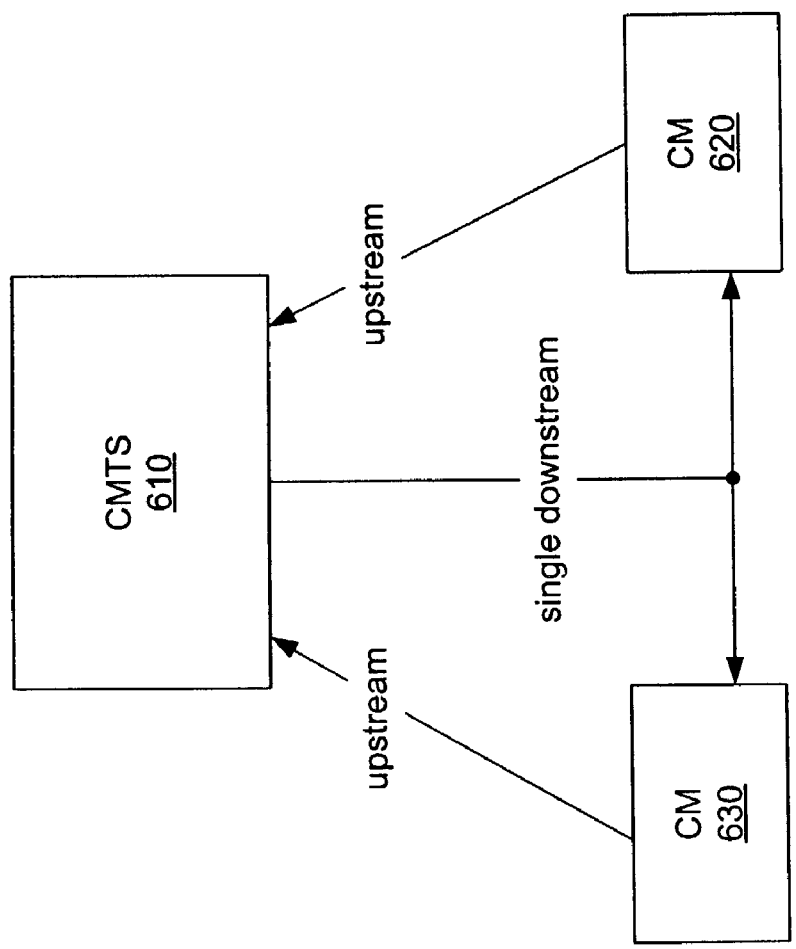
FIG. 2 illustrates the case of two cable modems (CMs) communicating with a single Cable Mode Termination System (CMTS)
Figure 3:
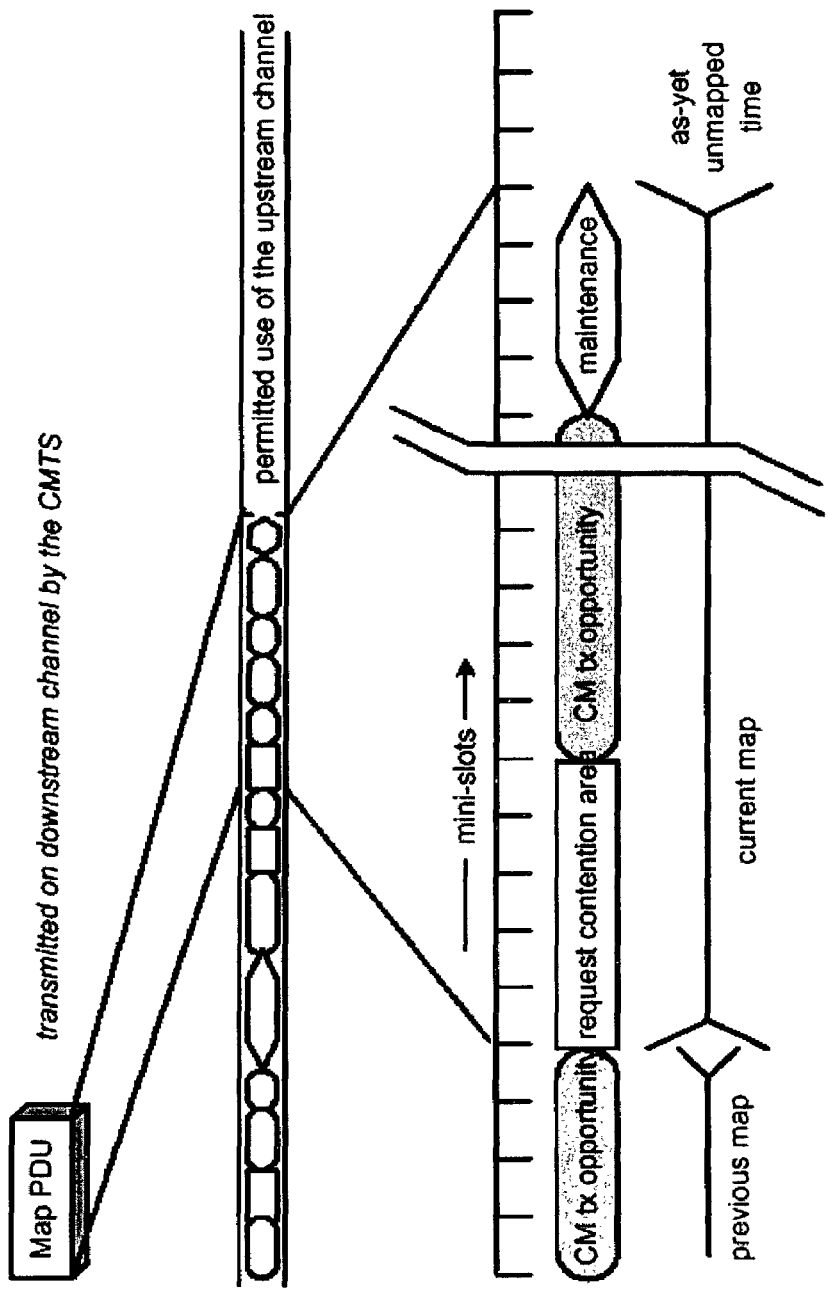
FIG. 3 describes DOCSIS bandwidth allocation and where transmit opportunities occur.
Figure 4:
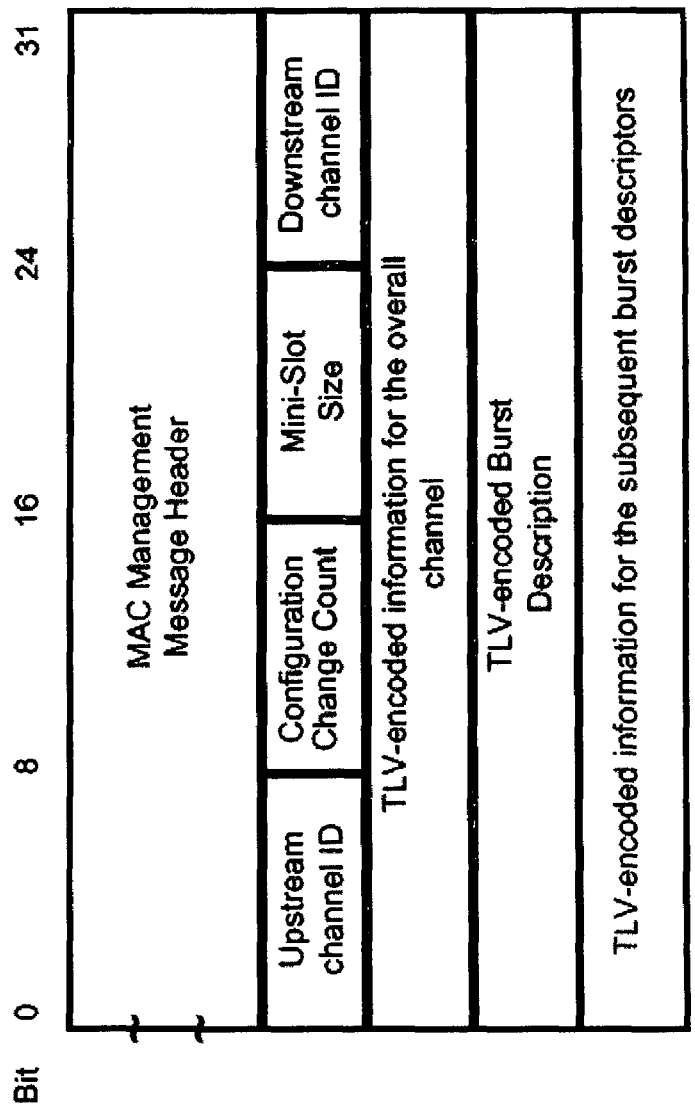
FIG. 4 illustrates an exemplary UCD.
Figure 5:
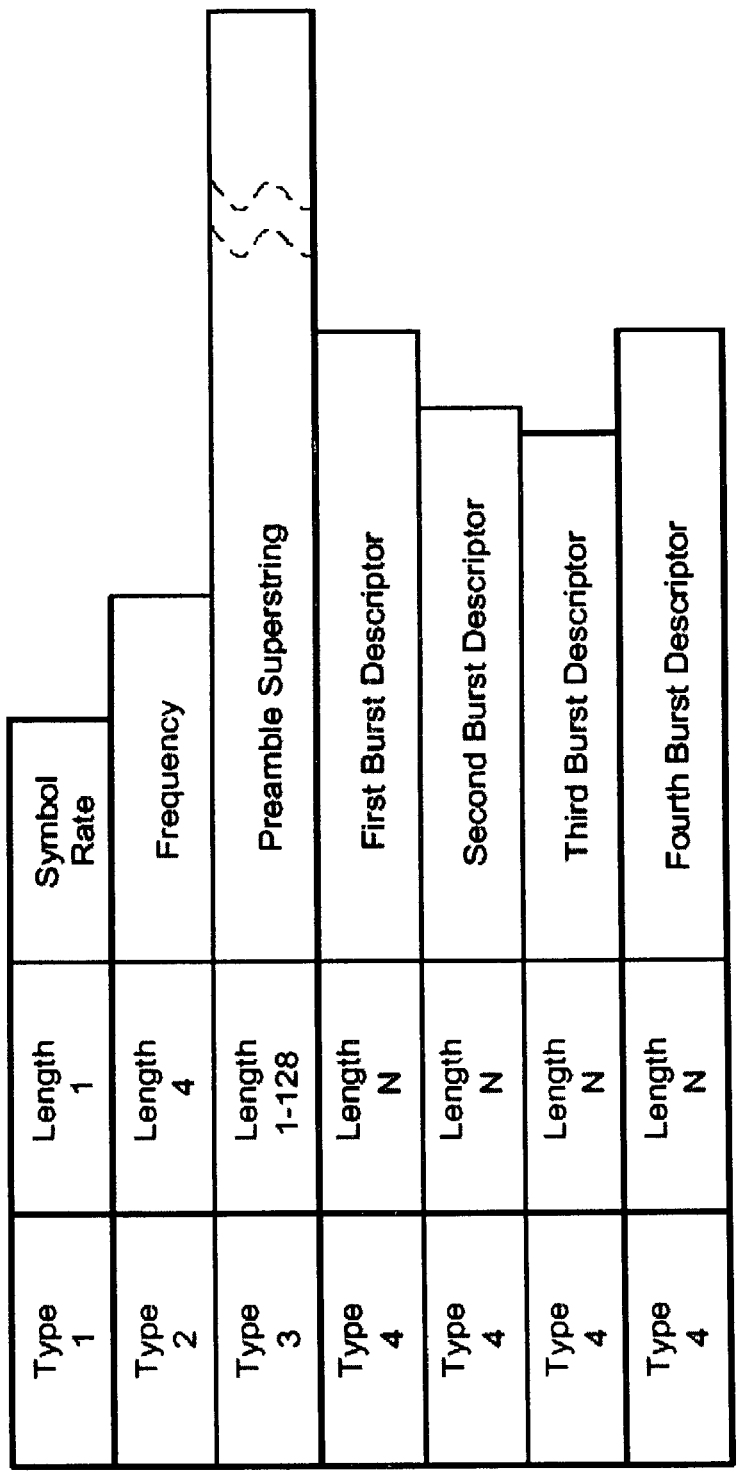
FIG. 5 illustrates an Upstream Channel Descriptor Message.
Figure 6:
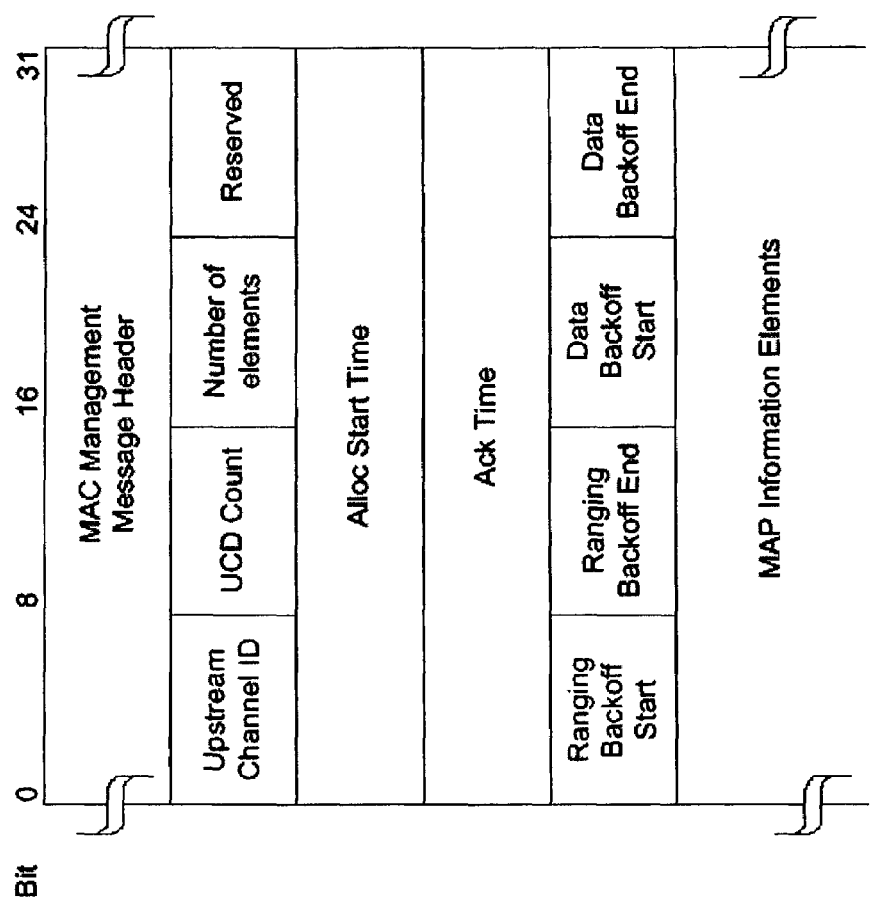
FIG. 6 illustrates an upstream bandwidth allocation MAP message.
Figure 7:
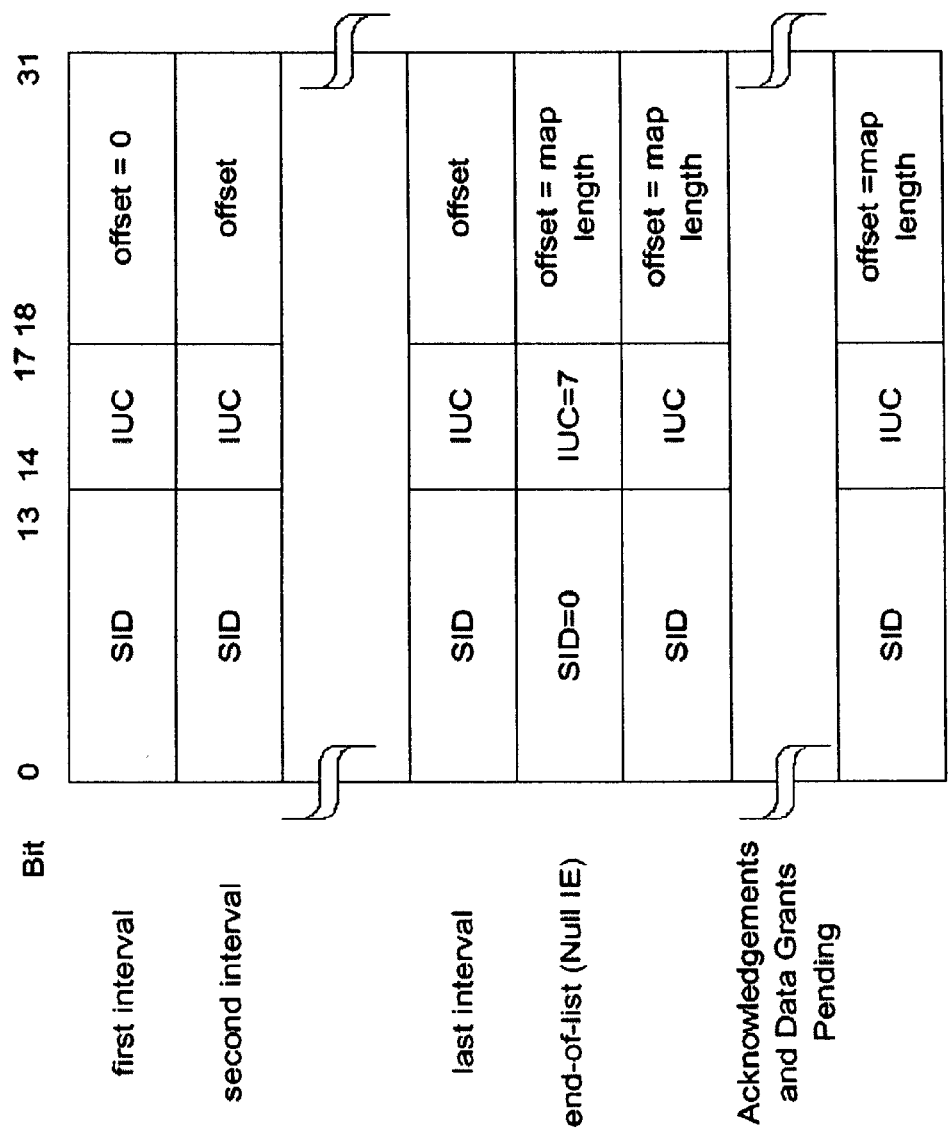
FIG. 7 illustrates the format of Information Elements.
Figure 8:
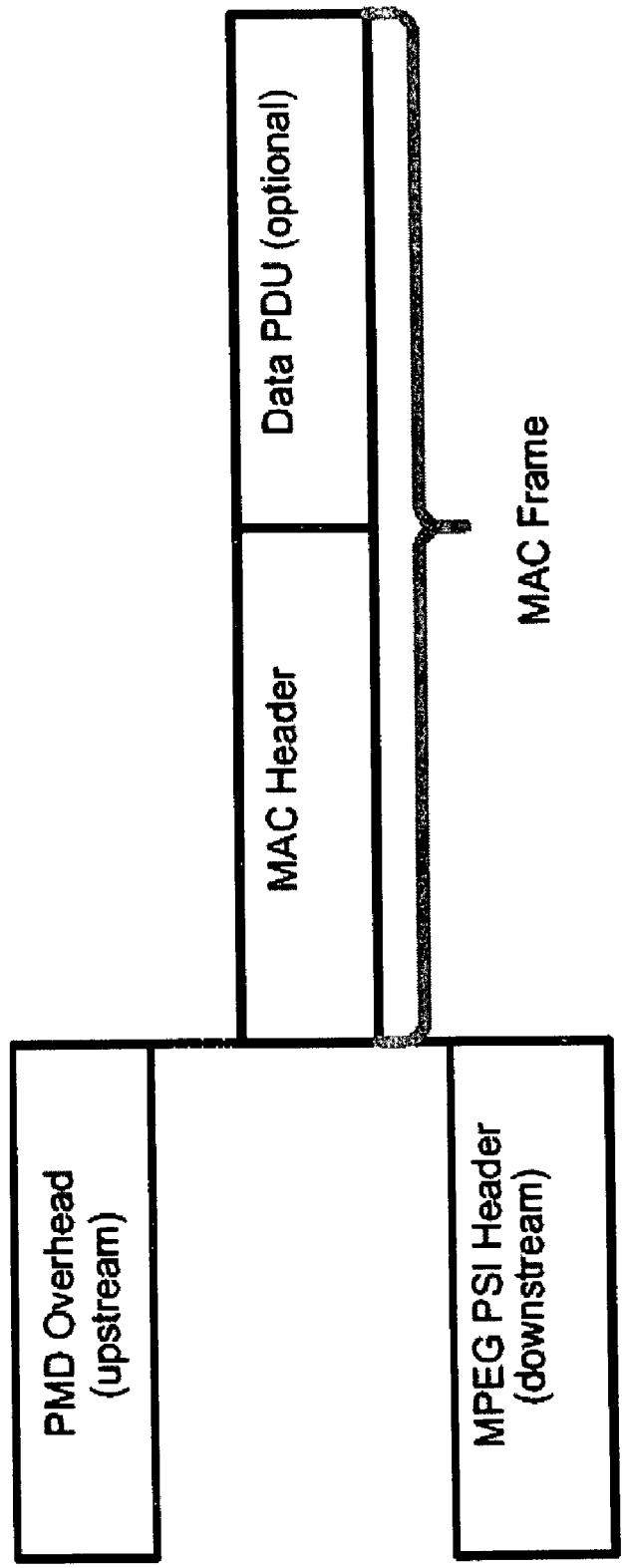
FIG. 8 illustrates the format of a DOCSIS MAC frame.
Figure 9:
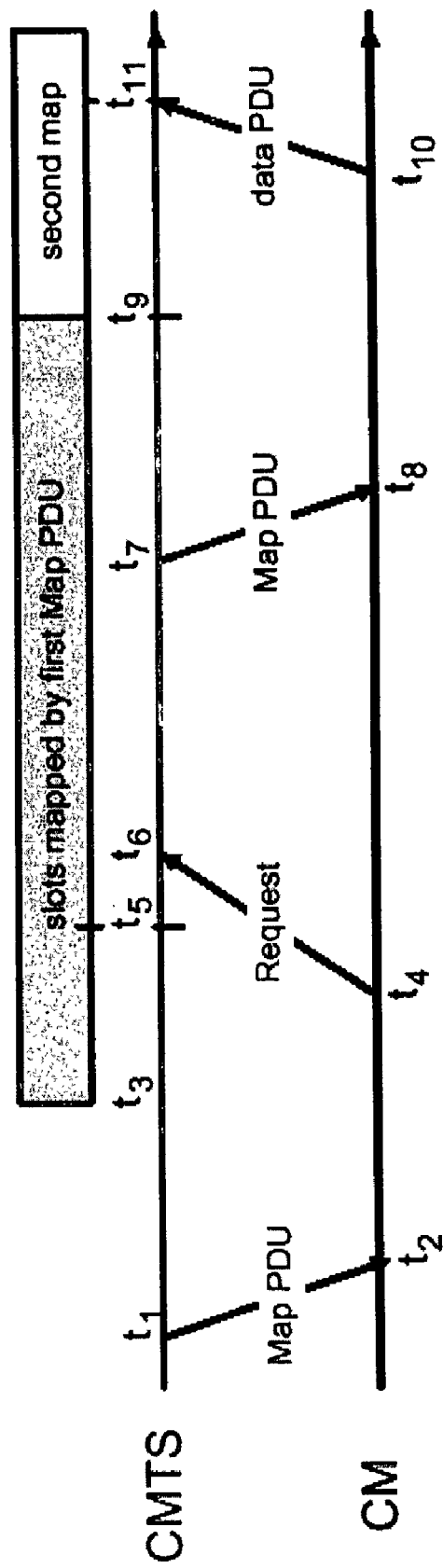
FIG. 9 illustrates the interchange between the CM and the CMTS when the CM has data to transmit Suppose a given CM has a data PDU available for transmission.
Figure 10:
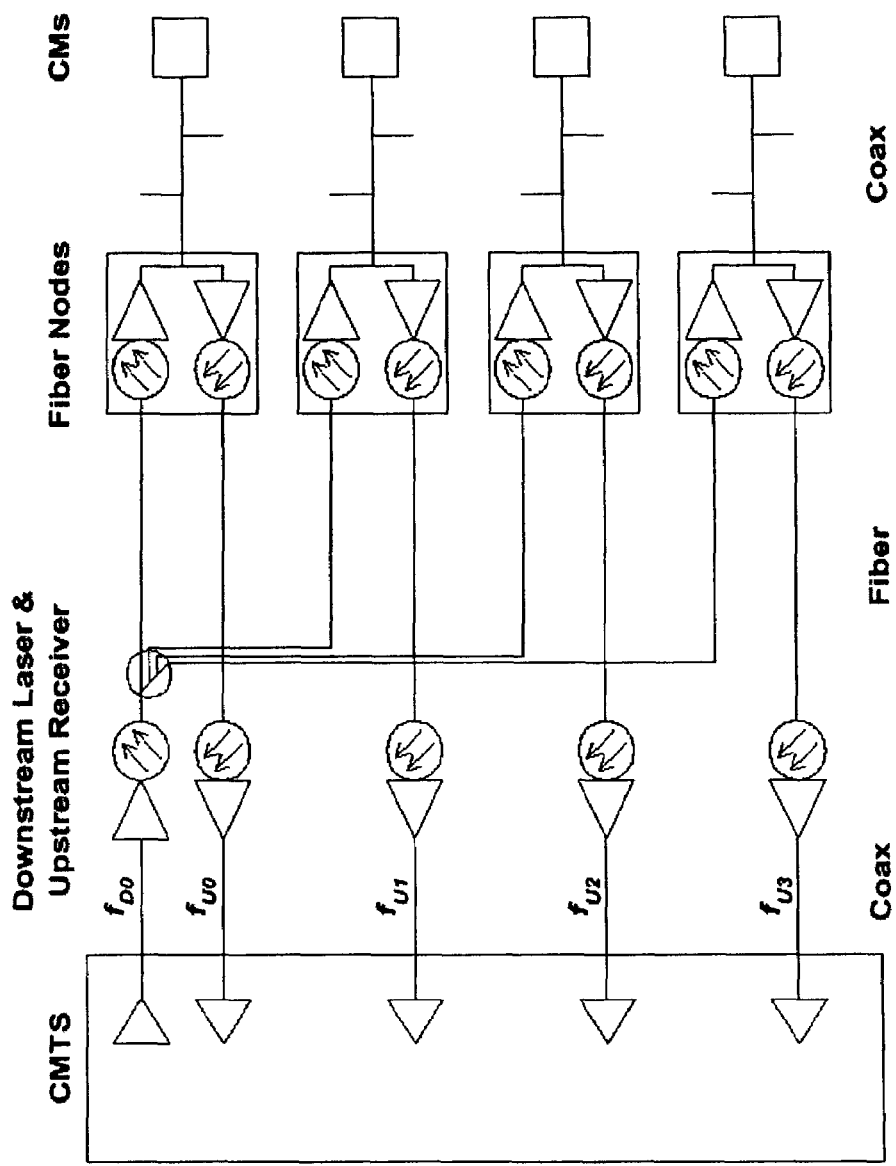
FIG. 10 illustrates an example of a single downstream channel and four upstream channels.
Figure 11:
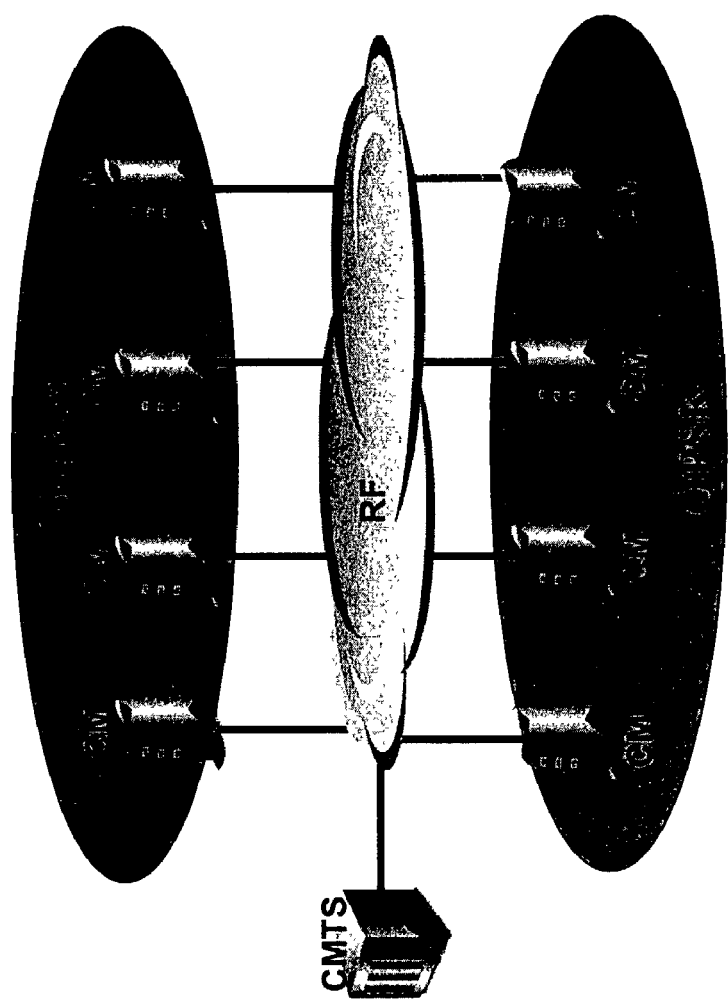
FIG. 11 illustrates a DOCSIS System with cable modems of different noise levels.
Figure 12:
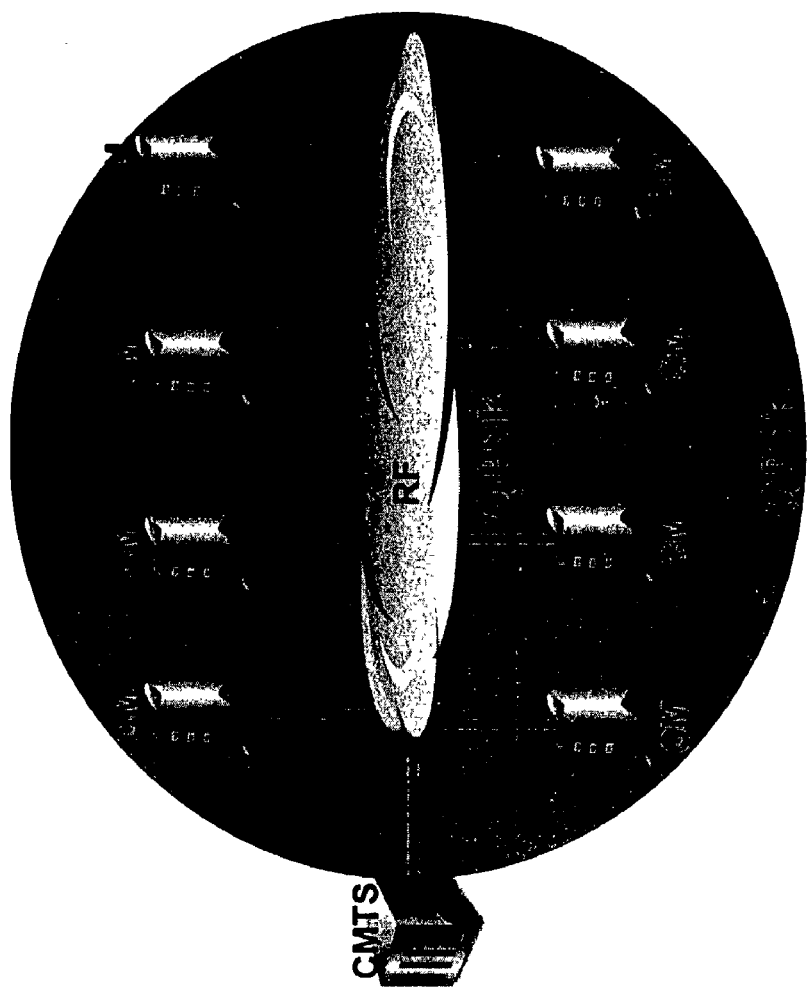
FIG. 12 illustrates a DOCSIS System with cable modems forced to operate using QPSK modulation.
Figure 13:
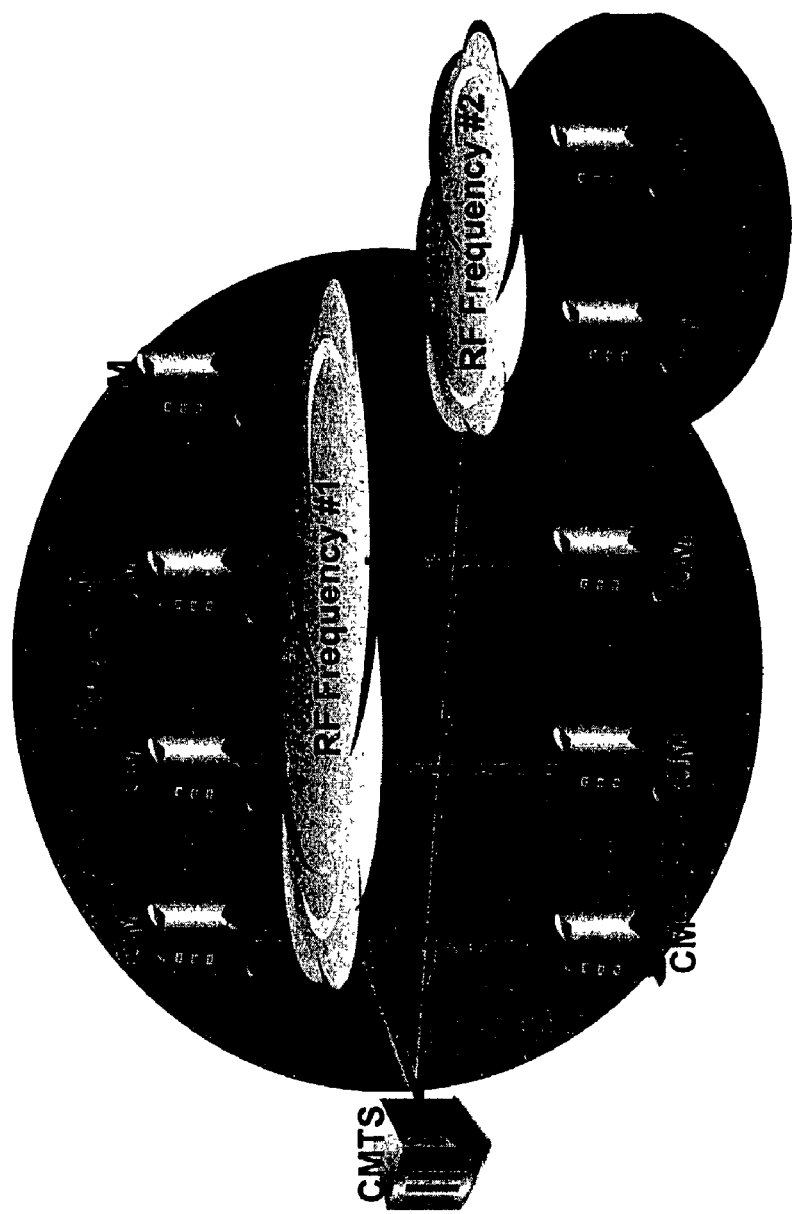
FIG. 13 illustrates an unequal number of CMs with different noise margins.
Figure 14:
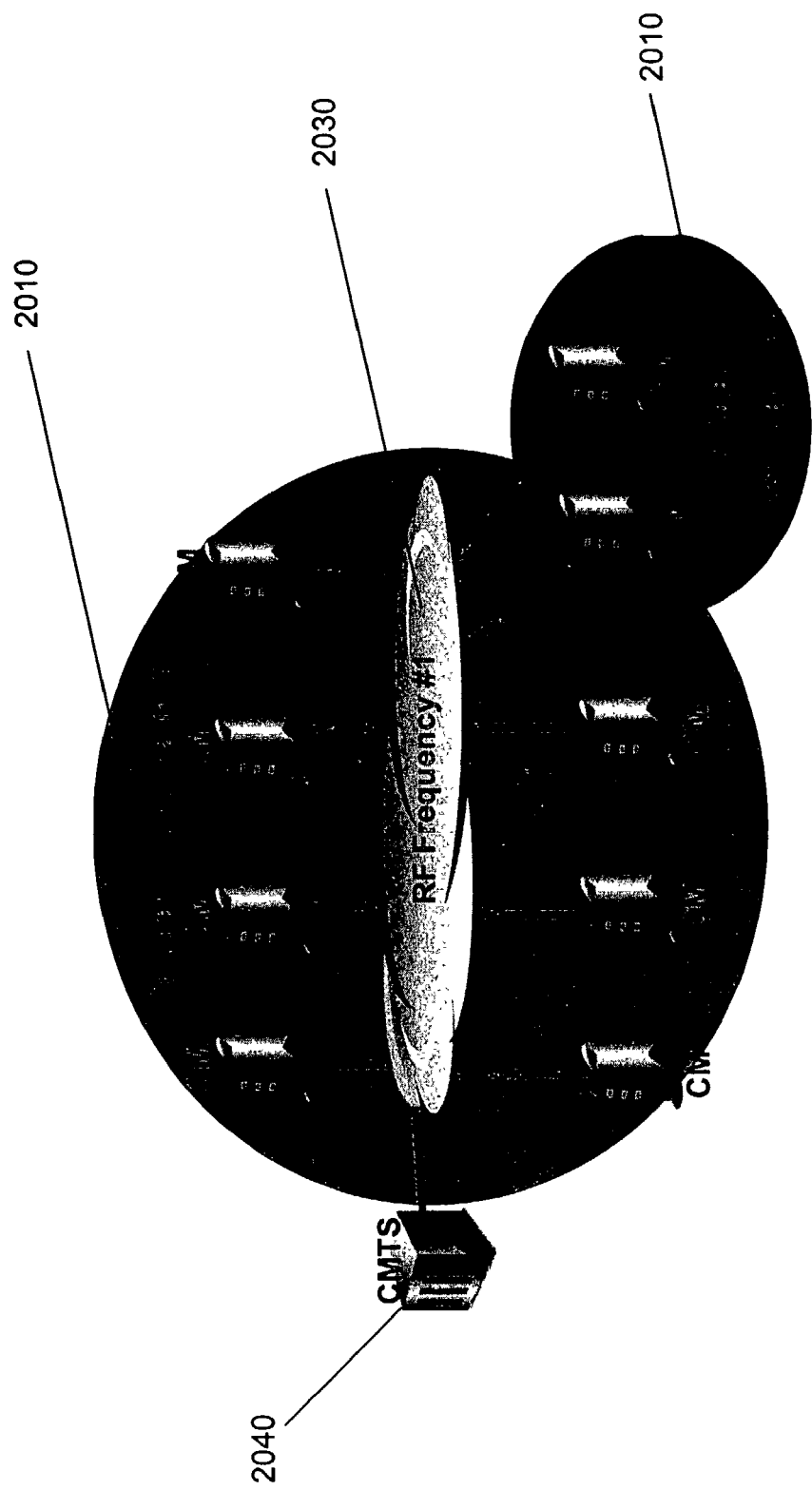
FIG. 14 illustrates the principal underlying virtual upstream channel provisioning according to one or more embodiments of the invention.

FIG. 14 illustrates the principal underlying virtual upstream channel provisioning according to one or more embodiments of the invention. The DOCSIS standard uses the term MAC Domain to denote a broadcast domain that can span multiple downstreams and upstreams. Conventionally, as described above, each physical downstream channel and physical upstream channel has a unique identifier. It generally assumed that a given upstream frequency should have one and only one DOCSIS physical upstream channel, which is identified by Upstream Channel Identifier (upstream channel ID). However, this is not the case when virtual upstream channels need to be provisioned.

In FIG. 14, a first virtual upstream channel 2010 (labeled Virtual Upstream #1) and a second virtual upstream channel 2020 (labeled Virtual Upstream #2) share the same physical frequency RF Frequency 2030. Of the nine cable modems (CMs) having their upstream traffic carried over RF frequency 2030, two are assigned to virtual upstream channel 2020 and the other seven are assigned to virtual upstream channel 2010. Conventionally, during initialization, a CMTS, such as CMTS 2040, would merely return the same UCID to each of the CMs since they are all tied to one port (i.e. the same RF frequency). By knowing the port to which a CM is connected, the CMTS assigns it its UCID. However, with virtual upstream channels, each virtual upstream channel should have a UCID unique of the other. Each of these UCIDs would be then assigned to all the CMs with the corresponding virtual upstream channels. For example, the two CMs carried on virtual upstream 2020 will be assigned a first UCID while the other seven CMs carried on virtual upstream channel 2010 would share a second UCID. In one embodiment of the invention, CMTS 2040 uses the MAC address of the CM from its MAC management message source address field and based upon the MAC address and the port the message was received from, decides which UCID to return to the CM. This allows the virtual upstream channel to be assigned initially before the CM performs initial ranging.

Without such an initial assigning of the virtual upstream channel in this manner, the CMTS 2040 could wait until conventional registration, which assigns some UCID to all of the CMs, and then change the UCID in accordance with established procedures for doing so. This may cause the CM whose UCID is changed to reflect its membership in a virtual upstream channel to reset if the CM needs to have a different IP address depending upon its assigned virtual upstream channel. While changing a UCID is of itself a conventional technique, it is only currently performed in the case of different ports or physical frequencies and is not done within the same physical frequency/port, which is a feature of the invention.

Another feature of virtual upstream channel provisioning is the ability to open new virtual upstream channels based upon differing conditions or quality-of-service (QOS) requests that may occur at any time. The CTMS 2040 can open a new virtual upstream channel and start to issue a Upstream Channel Descriptor (UCD) for the new channel. The CTMS 2040 can then assign CMs to the new virtual upstream channel through initialization of the CMs or through the procedure of changing the UCID. To round out the feature set, a virtual upstream channel once created can also be deleted or destroyed. This is achievable by forcing all CMs on a particular virtual upstream channel to a different virtual upstream channel and then not sending a UCD for the UCID of the virtual channel to be deleted. This eliminates the UCID from use, and thereby, eliminates the virtual channel that is corresponds to. Further, when the CMs in one virtual upstream channel exceed a numerical or capacity threshold, new virtual upstream channels can be created to accommodate new CMs or re-group existing CMs.

Using virtual upstream channels it is possible to put groups CMs of different symbol rate, preamble string, mini-slot size and burst profiles into the same DOCSIS upstream frequency. Since each CM is associated with one Upstream Channel ID that defines the upstream channel usage, it is now possible to associate modems with different noise groups with different Virtual Upstream Channel groups. For example, it is possible to use QPSK and 16-QAM modulation CMs with no software change to work within the same physical upstream channel.

CM Initialization Requirements

Among the steps for initializing a CM to work with virtual upstream channels is forcing the CM to a specific virtual upstream during initial ranging. Even though it is probable that all the CMs after the first reboot use the correct Upstream Channel ID, due to the fact that the initial ranging message does not contain the Upstream Channel Identifier that the CM is using, it is not possible for CMTS to reply with a Upstream Channel Identifier that would certainly match the CM picked Upstream Channel Identifier that it used to parse the upstream channel.

The CMTS requires that a new CM must be forced to the most robust channel by the putting that channel's ID in the Initial Ranging Response. A "new" CM is defined as a CM that the CMTS has not seen before or a CM that is seen to have a degraded bit error rate (BER) before reboot. The CMTS upon forcing the CM to work in the most robust, noise agile virtual upstream channel then should calculate the noise characteristics of the upstream channel used by the CM and find the virtual upstream channel that would best fit the CM. For the CMs that the CMTS has seen before (not new), the CMTS should return the proper channel ID that is suitable for the CM. One added feature would be a command-line interface settable timeframe (for example, 5 minutes) that within that timeframe if the CM reboots the CM will be assumed to have the same upstream channel characteristics and therefore use the same Virtual Upstream Channel ID as before reboot.

One way to implement this is for the CMTS to keep a mapping of the MAC address of CMs to their Upstream Channel ID in persistent memory. This can be complemented by or serves as a virtual upstream channel usage table and can be accompanied by a method to delete entries when the CLI set timeframe expires. When the CMTS receives an Initial Ranging message, the CMTS should retain the received MAC address of the CM from the MAC management message header and then use the MAC address of the CM to figure out which virtual upstream channel the CM should use.

At this point, the CMTS should return, in the Initial Ranging Response message the CMTS sends to the CM, the Upstream Channel ID value that corresponds to the MAC address in the virtual upstream channel usage table. It is possible for the CMTS to use other methods during initial ranging to force the CMs into different groups. One such measure is to control the number of CMs that belong to a virtual upstream channel. In this method the CMTS would assign the virtual upstream channel ID (thereby forcing the CM into the assigned virtual upstream channel) depending on the number of users on each virtual upstream channel and would try to minimize the maximum number of CMs in each virtual upstream channel, thereby minimizing the probability of collision at request contention areas. Such thresholding may be programmably or fixedly designated in the CMTS.

Changing the CM virtual upstream channel After Registration

The CMTS may not always decide which channel a CM should go to during the initial ranging process. Some reasons for this is the fact that the decision is based on the quality of service characteristic requested during registration or some other information obtained before registration regarding the modem. An example of information which is obtained before the registration, that can be used for the virtual upstream channel assignment decision is the DHCP (Dynamic Host Control Protocol)-carried information, that contains the type of CM and IP (Internet Protocol) subnet it belongs to.

Due the reasons that are described above and for other reasons, the CMTS may decide to force the CM into a different virtual upstream channel after registration. In such a case the CMTS could use the upstream channel change command (see above). In the upstream channel change command, the CMTS places the new Upstream Channel ID in the Upstream Channel Change Request command. The ranging technique should be described as the option "Use the new channel directly without performing initial or station maintenance". This is one exemplary way of changing or assigning after registration, the virtual upstream channel. The CM would reply to the change by sending the Upstream Channel Change Response message with the old Upstream Channel ID in the message. Some of the methods that may be used for deciding which CM should go into which virtual upstream channel includes, among others, the bandwidth requirements that are specified in the registration. It is also possible to make such a decision depending on the Dynamic Service Addition/Change/Delete commands.

In describing the invention, it was assumed that the modems grouped as 16-QAM and QPSK for the purpose of illustration only. It is possible that modems could be grouped per their FEC Error Correction, mini-slot size or symbol rates or other operating parameters. It is also possible that the noise spread is so large at a cable segment such that instead of using the same symbol rate, different modulation techniques, different groups of modems would use different symbol rates. In such a case, each virtual upstream channel will have a different symbol rate. The mechanism for such kind of decisions has to be based on the noise levels, impairment types and Reed-Solomon bandwidth utilization drop, BER gains, and can be readily implemented by one of skill in the art.

It is possible that mini-slot size is different for different types of modems. For example for Voice Over IP (VoIP) only embedded modems the mini-slot size can be made small to reduce the overhead due to the nature of small packets generated by the VoIP application and for the data a bigger mini-slot size can be defined.

Virtual upstream channels enable the utilization of different upstream characteristics without putting any restrictions on the number of cable modems that has to use the upstream channel to get better frequency utilization. Virtual upstream channels would enable the dynamic division of bandwidth between the QPSK and 16-QAM cable modems within the same physical upstream channel. As a result of virtual upstreams, now the QPSK cable modems can utilize the bandwidth gained by the use of 16-QAM modulation. It would be thus possible to add more cable modems to the upstream channel and still have the same average data bandwidth per cable modem. Since it enables these different upstream channels using only a single upstream receiver, virutal upstream channels do not increase the capital cost per cable modem while still maximizing the bandwidth efficiency. One of the most important advantages of virtual upstream channels is that it is transparent to the cable modem. Thus, any cable modem which is certified for DOCSIS is compatible with and would be able to use virtual upstream channels.

Although the present invention has been described in detail with reference to the disclosed embodiments thereof, those skilled in the art will appreciate that various substitutions and modifications can be made to the examples described herein while remaining within the spirit and scope of the invention as defined in the appended claims. Also, the methodologies described may be implemented using any combination of software, specialized hardware, firmware or a combination thereof and built using ASICs, dedicated processors or other such electronic devices.

What is claimed is:

1. A method of partitioning groups of cable modems in a broadband communications system, comprising:
   segregating a first physical upstream channel, that transmits data through a cable segment connected to a plurality of groups of cable modems, into a plurality of virtual upstream channels;
   assigning each group of cable modems to one of said virtual upstream channels, wherein each group of cable modems is initially assigned a unique upstream channel identifier, wherein the initially assigned unique upstream channel identifier is determined based upon a MAC address initially received from a cable modem and a port that received the MAC address; and
   provisioning said communications system by sending the initially assigned unique upstream channel identifier to each of the cable modems in the assigned group of cable modems within a MAC management message, wherein each cable modem can utilize their initially assigned virtual upstream channel to transmit data thereon.

2. A method according to claim 1 wherein assigning each group of cable modems to one of said virtual upstream channels includes:
   determining operational parameters of said cable modems; and
   grouping said cable modems in accordance with their determined operational parameters.

3. A method according to claim 2 wherein said grouping said cable modems in accordance with their determined operational parameters is performed to accommodate newly registering cable modems.

4. A method according to claim 2 wherein said operational parameters of said cable modems includes a symbol rate, preamble superstring, mini-slot size, and burst profiles, all transmitted at a single carrier frequency.

5. A method according to claim 2 wherein said determined operational parameters includes a quality of service parameter.

6. A method according to claim 2 wherein said operational parameters of said cable modems include a perceived latency of users of said cable modems.

7. A method according to claim 1 wherein provisioning said communications system further comprises:
   determining that each of said virtual upstream channels does not interfere with a bandwidth allocation of other virtual upstream channels.

8. A method according to claim 1 wherein a subsequently assigned unique upstream channel identifier for each of said virtual channels is sent as a replacement for the initially assigned unique upstream channel identifier that has already been sent to said cable modem.

9. A method according to claim 1, further comprising: adding a new virtual upstream channel to said virtual upstream channels after provisioning said communication system.

10. A method according to claim 1, further comprising:
    deleting one of said virtual upstream channels after provisioning said communication system.

11. A method according to claim 1 wherein assigning each group of cable modems to one of said virtual upstream channels includes:
    determining an optimal number of said cable modems that can share said virtual upstream channel; and
    grouping said cable modems in accordance with the determined optimal number.

12. A method according to claim 1 wherein said first physical upstream channel is carried on a single frequency, said virtual upstream channels sharing said single frequency.

13. A broadband communications system for transmitting information, comprising:
    a cable modem termination system capable of supporting a plurality of physical upstream channels and physical downstream channels in said communications system;
    a plurality of groups of cable modems coupled to said cable modem termination system, each of said groups of cable modems sharing the same physical upstream channel, said same physical upstream channel configured by said cable modem termination system to be segregated into a plurality of virtual upstream channels, each of said groups of cable modems exclusively utilizing one said virtual upstream channels; and
    a database coupled to said cable modem termination system, said database configured to map each group of cable modems to a unique virtual upstream channel identifier, wherein the database initially maps a unique upstream channel identifier to a cable modem based upon a MAC address initially received from the cable modem and a port that received the MAC address, wherein said cable modem termination system sends the unique virtual upstream channel identifier to each cable modem in a group of cable modems within a MAC management message.

14. A system according to claim 13 wherein said cable modem termination system is configured to group cable modems into said groups in accordance with determined operational parameters of the cable modems.

15. A system according to claim 14 wherein said operational parameters of the cable modems are determined by reference to a MAC addresses of the cable modems.

16. A system according to claim 14 wherein said virtual upstream channels may be added, deleted or modified after initially being segregated into a plurality of virtual upstream channels.

17. A system according to claim 14 wherein said cable modem termination system modifies the groups of cable modems based upon a dynamic assessment of said operational parameters of a cable modem.

18. A system according to claim 14 wherein said operational parameters of the cable modems include the modulation scheme employed by said cable modems.

19. A system according to claim 13 wherein newly registering cable modems can be assigned to said groups.

20. A system according to claim 13 wherein said cable modem termination system assigns virtual upstream channels based upon an optimal number of cable modems that can share each virtual upstream channel.

21. A system according to claim 13 wherein said physical upstream channel is carried on a single frequency.

* * * * *